(12) United States Patent
Ayotte et al.

(10) Patent No.: US 8,082,226 B2
(45) Date of Patent: Dec. 20, 2011

(54) USING USER CONTEXT INFORMATION TO SELECT MEDIA FILES FOR A USER IN A DISTRIBUTED MULTI-USER DIGITAL MEDIA SYSTEM

(75) Inventors: Louis Ayotte, Montreal (CA); Donald Carignan, Tyngsboro, MA (US); Lyne Champagne, Verdun (CA); Steven Lowell, Georgetown, MA (US); Roger Sacilotto, Saugus, MA (US); Roger Tawa, Jr., Brossard (CA); Stéphane Daigle, Montreal (CA)

(73) Assignee: Avid Technology, Inc., Burlington, MA (US)

( * ) Notice: Subject to any disclaimer, the term of this patent is extended or adjusted under 35 U.S.C. 154(b) by 542 days.

(21) Appl. No.: 12/286,988

(22) Filed: Oct. 3, 2008

(65) Prior Publication Data

US 2009/0083245 A1 Mar. 26, 2009

Related U.S. Application Data

(63) Continuation of application No. 12/148,145, filed on Apr. 17, 2008, now abandoned.

(60) Provisional application No. 60/925,615, filed on Apr. 21, 2007.

(51) Int. Cl.
*G06F 7/00* (2006.01)
*G06F 17/00* (2006.01)

(52) U.S. Cl. ........ 707/636; 707/638; 707/693; 707/695; 707/E17.006; 715/229; 715/242; 345/698; 345/699

(58) Field of Classification Search .................. 707/636, 707/638, 695, 696, 711, 715, 741, 770, 830, 707/966, 693, E17.006; 709/201, 203, 229, 709/242; 345/698, 699, 3.3, 3.4; 715/229
See application file for complete search history.

(56) References Cited

U.S. PATENT DOCUMENTS 5,267,351 A 11/1993 Reber et al.
(Continued)

FOREIGN PATENT DOCUMENTS

JP 2000-348035 12/2000
(Continued)

OTHER PUBLICATIONS

R. C. Peterson & J. S. Wolffsohn—"The Effect of Digital Image Resoulution and Compression in Anterior Eye Imaging" bjo.bmj.com "Scientific Report", group.bmj.com, December 3, 2004 (pp. 828-830).*
(Continued)

*Primary Examiner* — Giovanna Colan
*Assistant Examiner* — Anh Ly
(74) *Attorney, Agent, or Firm* — Oliver Strimpel

(57) ABSTRACT

In a distributed or multi-user system, it is possible for a user to try to access a media file that is not optimal for the user's purposes. In other words, the best quality version of some source material might not be the most optimal version for all users. For example, some users might use less network bandwidth if they used lower resolution video data. User context information is used to limit which versions of a source may be provided to a user that requests the source. The system interprets the user context information to provide the best quality version of the source for the user's purposes. Example user context information may include a specified working resolution and/or a specified target resolution for the user. The context information may be specified for the user or may be specified for a group of users, location of the user or other characteristic related to the user, from which the user in turn inherits the context information. User context information may include an identifier of an application being used by an individual. The user context information also may indicate whether the user may receive media files with data at resolutions higher than or lower than the specified resolutions.

17 Claims, 2 Drawing Sheets

U.S. PATENT DOCUMENTS

| | | | |
|---|---|---|---|
| 5,355,450 | A | 10/1994 | Garmon et al. |
| 5,513,375 | A | 4/1996 | Peters |
| 5,577,190 | A | 11/1996 | Peters |
| 5,584,006 | A | 12/1996 | Reber et al. |
| 5,640,601 | A | 6/1997 | Peters |
| 6,018,337 | A | 1/2000 | Peters et al. |
| 6,061,758 | A | 5/2000 | Reber et al. |
| 6,118,444 | A | 9/2000 | Garmon et al. |
| 6,157,929 | A | 12/2000 | Zamiska et al. |
| 6,249,280 | B1 | 6/2001 | Garmon et al. |
| 6,489,969 | B1 | 12/2002 | Garmon et al. |
| 6,553,142 | B2 | 4/2003 | Peters |
| 6,571,255 | B1 | 5/2003 | Gonsalves et al. |
| 6,636,869 | B1 | 10/2003 | Reber et al. |
| 6,792,433 | B2 | 9/2004 | Cornog et al. |
| 6,813,622 | B2 | 11/2004 | Reber et al. |
| 7,165,219 | B1 | 1/2007 | Peters et al. |
| 7,562,099 | B1 | 7/2009 | Walsh et al. |
| 2002/0190876 | A1* | 12/2002 | Lai et al. .......... 341/50 |
| 2003/0012403 | A1* | 1/2003 | Rhoads et al. .......... 382/100 |
| 2003/0135867 | A1* | 7/2003 | Guedalia .......... 725/126 |
| 2004/0199507 | A1* | 10/2004 | Tawa, Jr. .......... 707/7 |
| 2005/0071323 | A1* | 3/2005 | Gabriel et al. .......... 707/3 |
| 2005/0216443 | A1* | 9/2005 | Morton et al. .......... 707/3 |
| 2006/0112143 | A1* | 5/2006 | Subramanian .......... 707/104.1 |
| 2006/0184673 | A1* | 8/2006 | Liebman .......... 709/225 |
| 2007/0027857 | A1* | 2/2007 | Deng et al. .......... 707/3 |
| 2008/0033986 | A1* | 2/2008 | McCusker et al. .......... 707/102 |
| 2008/0162713 | A1* | 7/2008 | Bowra et al. .......... 709/231 |
| 2009/0125534 | A1* | 5/2009 | Morton et al. .......... 707/100 |

FOREIGN PATENT DOCUMENTS

| | | |
|---|---|---|
| JP | 2002-244968 | 8/2002 |
| JP | 2003-46977 | 2/2003 |
| WO | WO 02/056563 | 7/2002 |

OTHER PUBLICATIONS

Wactlar et al.—"Lessons Learned from Building a Terabyte Digital Video Library"—in "Compuer" Feb. 1999, vol. 32, Issue 2 (pp. 66-73).*

Mohan, Rakesh, et al., Adapting Multimedia Internet Content for Universal Access, IEEE Transactions on Multimedia, vol. 1, No. 1, Mar. 1999, pp. 104-114.

* cited by examiner

USING USER CONTEXT INFORMATION TO SELECT MEDIA FILES FOR A USER IN A DISTRIBUTED MULTI-USER DIGITAL MEDIA SYSTEM

CROSS-REFERENCE TO RELATED APPLICATIONS

This application claims priority to and the benefit of, under 35 U.S.C. §120, and is a continuation application of application Ser. No. 12/148,145, filed on Apr. 17, 2008, now abandoned, which is a nonprovisional application claiming priority under 35 U.S.C. §119 to provisional Application Ser. No. 60/925,615, filed on Apr. 21, 2007, abandoned; both of which are incorporated herein by reference.

BACKGROUND

In a distributed system for editing digital media, it is useful to have an index that indicates which media is accessible to users of the system. Such indexing typically is performed by identifying media files among the computer data files that are accessible to the system. Any identified media files then are indexed. The index is usually accessed by requesting some identified source material, and the media file containing a version of the source material is provided. A user's application typically requests the source, and the best quality version of the source material available in the system is provided to the user.

SUMMARY

In a distributed multi-user system, it is possible for a user to try to access a media file that is not optimal for the user's purposes. In other words, the best quality version of some source material might not be the most optimal version for all users. For example, some users might use less network bandwidth if they used lower resolution video data.

User context information is used to limit which versions of a source may be provided to a user that requests the source. The system interprets the user context information to provide the best quality version of the source for the user's purposes. Example user context information may include a specified working resolution and/or a specified target resolution for the user. The context information may be specified for the user or may be specified for a group of users, location of the user or other characteristic related to the user, from which the user in turn inherits the context information. User context information may include an identifier of an application being used by an individual. The user context information also may indicate whether the user may receive media files with data at resolutions higher than or lower than the specified resolutions.

If two resolutions are specified, such as a working resolution and a target resolution, then the user can be informed of the availability of both resolutions. For example, if an individual is editing a video program using media files at specified working resolutions, it might be helpful to communicate to the individual if the target resolution, i.e., the resolution in which the video program ultimately will be delivered, is available in the system. The unavailability of material at the specified working or target resolutions may prompt other operations to be performed by the system, such as retrieval of the unavailable material from an archive or the generation of the unavailable material from existing material.

DETAILED DESCRIPTION

Figure 1:
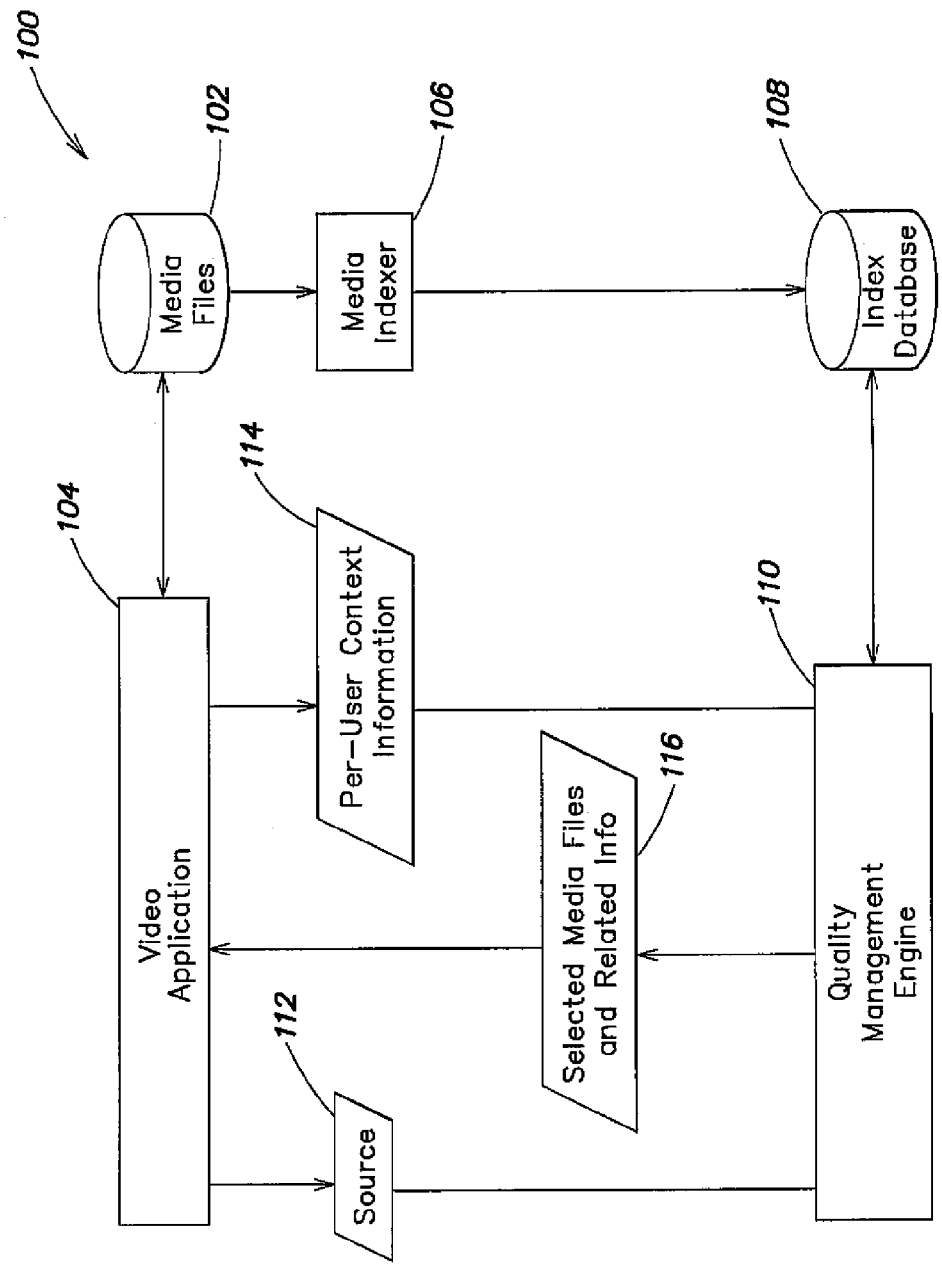
FIG. 1 is an example block diagram of a system that accesses an index database using user context information.

Referring now to FIG. 1, a block diagram of an example distributed multi-user media system 100 for collaborative managing and editing digital media will now be described. Digital media includes, but is not limited to, video data, sound data, image data and animation data. Herein, video is used as an example of such media data. A user may be an individual user of an application, or an application itself. Such a system 100 may have multiple applications on multiple computers that are interconnected through a computer network to storage 102 for media files. A video application 104 is representative of such a computer with such an application. Video application 104 may comprise, for example, an archiving application or an editing application, such as the MEDIA COMPOSER™ editing system sold by Avid Technology, Inc. However, the invention is not limited to any particular applications, or configuration of computers, networks and storage.

A media indexer 106 maintains an index of the media files in the storage 102. A media indexer may reside on a computer for indexing local storage attached to that computer, and/or one or more media indexers may index shared storage. A media indexer maintains an index 108 that associates metadata about the media data with the name (e.g., the path and filename) of a media file that includes that media data. The metadata also may be stored in the media file. Such metadata may include, for example, an indication of a source from which the media was obtained, such as a tape name, a range of data from the source, such as start and stop time codes in the source, and an indication of the quality of the media data. In the process of indexing a media file, any metadata included in the media file is extracted from the media file or generated and stored in the index along with the name of the media file. Example indexes for media files are described in U.S. Pat. No. 5,267,351 and U.S. Pat. No. 6,157,929, which are hereby incorporated by reference.

In one example, the index separates information concerning the specifics of a piece of digitized media, information specific about the source material the media was derived from, and information concerning the connection of media data to those requesting or needing access to it. Specifically, three groups of information that may be distinctly separated from each other are:

(a) information concerning physical source mediums may indicate which sets (or subsets) of physical source material are equivalent, or make correlations in the labeling of certain segments of the source material (example: film edge numbers equivalenced (i.e., correlated with time code);

(b) information about the specific digitized media as to the type of media, the length of the data, the range on the source the media represents and the locations of such media resources; and (c) information concerning the binding of the media data to the requesters of media. Binding of media resources to those in need of the media is not typically made until the request for the media is made, and the fulfillment of the request may change depending on the media available at the time of the request.

An index may be maintained as a multidimensional database. For example, the database may be a table of "media slots" where each media slot corresponds to a time span and a quality. This database permits a search of whether a media file is available that corresponds to specified metadata, such as specified time span of a source and a specified quality. The database may be implemented to perform federated and chained searches. More details of a media indexing system also are provided in pending U.S. patent application Ser. No. 10/407,711 (PG. Pub. No. 20040199507), which is also hereby incorporated by reference.

To maintain such an index, a media indexer monitors activity on any storage location with which it is associated. How the monitoring is performed depends on the operating system and file system that manages the storage locations and how the indexer can communicate with the operating system and file system. For example, this monitoring of local storage on a Windows platform may be performed by registering a process for the indexer to receive notifications of changes from the Windows file system. This mechanism is called the ReadDirectoryChangesW application programming interface (API) in the Windows operating system. For remote storage using the Windows operating system, a similar mechanism may be used, called the FindFirstChangeNotification and FindNextChangeNotification APIs in the Windows operating system. In such an embodiment, any additions, deletions or other modifications to files in the designated storage locations cause a notification to be sent to the media indexer, which in turn updates its index. Other ways to perform such monitoring include having the indexer periodically poll or scan the file system for information to detect changes, or to have the operating system provide a form of notification through an interrupt or event to be processed. The index then can be accessed by any of a number of applications in the same manner as conventional indexes.

Because there may be many different types of media data and thus media files, a plug-in architecture may be used to allow for specification of new types of media files. Such a structure, herein called a table adapter, is provided for this purpose. A table adapter extracts the media metadata from the media file, in whatever form it may be, and then "adapts" it to structure of the database stored by the media indexer. This architecture permits any media file type to be indexed so long as a specific table adapter for the media file type is created.

The media indexer assists a quality management engine (QME) 110 in allowing a variety of media management functions to be performed. Example media management functions include, but are not limited to purging media, finding master clips and sequences associated with media, and navigation of metadata and media data relationships.

When an application such as video application 104 needs a media file, it accesses the index database 108 through QME 110. In one embodiment QME 110 resides local to, and may even be an integrated module of, video application 104. In other embodiments, QME 110 is remote from video application 104, and may provide quality management services to multiple video applications in the distributed media authoring system. The application 104 indicates the source for which it is requesting a media file. The source may be, for example but not limited to, a tape name for a video tape from which a media file may have originated, or some other unique identifier used in the system to identify a source from which a media file may have originated.

The identifier of the source typically is used in an editing system to refer to media information being edited. In the editing system, an audiovisual program or other media composition typically is defined by a combination of one or more sequences, with each sequence having one or more segments of media information, where each segment is defined by a portion of media information from a source. The portion of media information typically is defined by a start time and a duration or stop time within the source. With the system shown in FIG. 1, the identification of the source for a segment is used to dynamically link or relink the best quality media data from among available media files to the defined segment.

In particular, given a source identifier and a specified portion within it, the quality management engine accesses the index database 108 to determine what media files are available. The set of available media files can be filtered by per-user context information 114. The identities of the available media files that also match the user context information are provided to the application 1116. Other related information also may be provided to the application, such as metadata associated with the media files and/or an indication of whether there is no media file available that matches the user context information. The application then dynamically links or relinks any references to the source material in its media composition to the indicated files.

User context information is interpreted to provide the best quality version of the available media files for a source for the user's purposes. The user context information may include parameters related to the quality of the media data such as sample rate, sample bit depth, encoding format, image or raster size, aspect ratio, frame or field rate, field format (progressive or interlaced), compression format, color format (RGB, YUV, etc.), etc.

As one example, a group of editors that generate rough cuts of stories may have user context information that specifies that DV25 compressed, standard definition video information is the best quality for them to use. When these editors request video data, the system provides DV25 material to their application. An archiving application may have user context information that specifies that it should receive uncompressed high definition video information. When the archiving application receives a request to archive a media composition, it receives uncompressed high definition video information to relink to the composition to generate the archive version of the composition.

As another example, user context information may include a specified working resolution and/or a specified target resolution for the user. A working resolution is the encoding format used by the application for when the user is, for example, browsing or editing a video program. The target resolution is the encoding format used by the application or some other application for when the user is, for example, distributing the completed video program to a DVD, the internet, a playback device, another editor or other destination.

The context information may be specified for the user or may be specified for a group of users, location of the user or other characteristic related to the user, from which the user in turn inherits the context information. For example, all editors in a group of editors at one location may have the same working and target resolutions set by an administrator for the group.

User context information may include environment information in addition to media quality specifications. For example, user context information may include an identifier of the application being used by the user, access rights, bandwidth of available network connections, and media proximity (whether there is a preference for locally stored files or files on shared storage). The user context information also may indicate whether the user may receive media files with data at resolutions higher than or lower than the specified resolutions.

Figure 2:
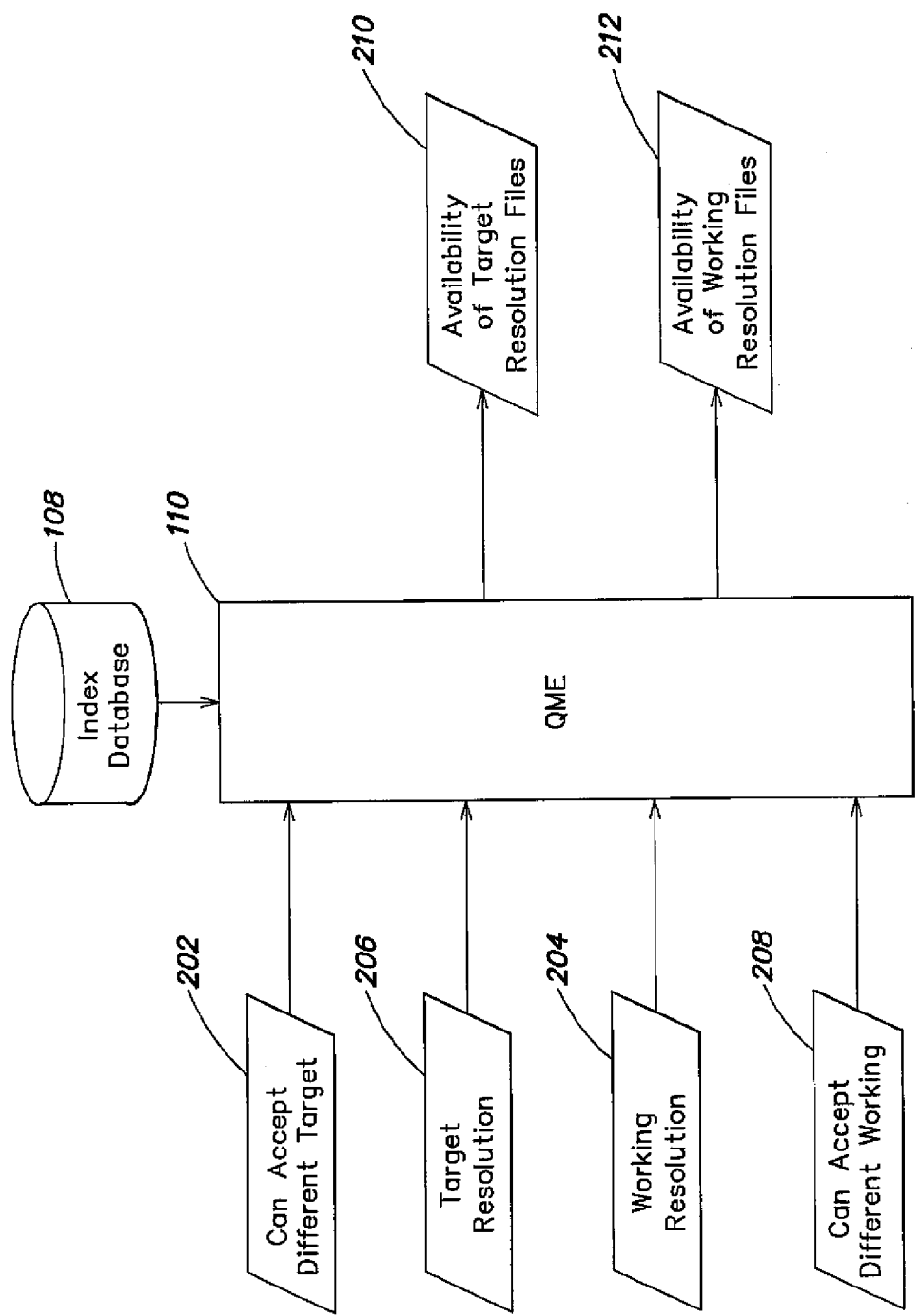
FIG. 2 is an example block diagram of an index lookup using working and target resolution information.

Referring now to FIG. 2, an example block diagram of an index lookup using working and target resolution information is shown. In this example, the QME 110 that access the index 108 receives an indication of a working resolution 204, a target resolution 206 and indications 202, 208 of whether the user may receive media files with data at resolutions higher than or lower than the specified resolutions. The QME 110 can identify available data files, and also provide an indication 210 of the availability of target resolution files, and an indication 212 of the availability of working resolution files. If two resolutions are specified by the user context information, such as a working resolution and a target resolution, then the user can be informed of the availability of both resolutions. For example, if an individual is editing a video program using media files at specified working resolutions, it might be helpful to communicate to the individual if the target resolution, i.e., the resolution in which the video program ultimately will be delivered, is available in the system. In such an instance, in a graphical user interface for the application, a timeline view of the video program being edited may highlight a portion of a clip for which a media file at a target resolution is not available. The individual may continue to work if the media file at the working resolution is available, but the individual may benefit in knowing whether the media file at the target resolution is unavailable. Actions could be initiated to make it available.

The unavailability of material at a resolution specified by the user context information, such as at the specified working or target resolutions, may prompt other operations to be performed by the system. One operation that could be performed is the retrieval of the unavailable material from an archive. Alternatively, the system could generate the unavailable material from existing material through a transcoding process.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. A system such as described herein may be designed as separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system, for managing access to media files in a distributed media system, comprising:
    a computer implementing a quality management engine having access to an index database that indexes media files available to the distributed media system; and
    one or more users providing requests for media files to the quality management engine, wherein a request includes an indication of one or more sources, and wherein the media files available to the distributed media system include a plurality of versions of the one or more sources, each of the plurality of versions for a given source of the one or more sources having at least one of a different resolution and compression;
    wherein the quality management engine identifies, from the index database, available media files for the one or more sources, and provides, to the one or more users requesting the one or more sources, identities of the available media files that include a version of the one or more sources having at least one of a resolution and compression determined from respective user context information for the one or more users.

2. The computer-implemented system of claim 1, wherein the user dynamically links references to the one or more sources to the available media files identified by the quality management engine.

3. The computer-implemented system of claim 1, wherein:
    the user context information includes multiple resolutions suitable for the one or more users; and
    the quality management engine identifies the availability of media files including versions of the one or more sources in each of the multiple resolutions.

4. The computer-implemented system of claim 1, wherein, if a media file is unavailable for the one or more requested sources, the unavailable material is retrieved from an archive in order to make it available to the one or more users.

5. The computer-implemented system of claim 1, wherein, if a media file is unavailable for the one or more requested sources, the unavailable material is generated from existing media files in order to make it available to the one or more users.

6. The computer-implemented system of claim 1, wherein the user context information includes at least one characteristic selected from the group consisting of an indication whether media files with higher than or lower than the resolution of the media files associated with the one or more requested sources are acceptable to the one or more users, user environment information, and media quality parameters.

7. The computer-implemented system of claim 1, wherein at least one of the one or more sources comprises a media file origin identifier and a specified portion of the source.

8. A computer-implemented method for managing access to media files in a distributed media system, comprising the steps of:
   providing access to an index database that indexes media files available to the distributed media system;
   receiving requests from one or more users for media files, wherein a request includes an indication of one or more sources, and wherein the media files available to the distributed media system include a plurality of versions of the one or more sources, each of the plurality of versions for a given source of the one or more sources having at least one of a different resolution and compression;
   identifying, from the index database, available media files for the one or more sources that include a version of the one or more sources having at least one of a resolution and compression determined from user context information for the one or more users; and
   providing to the one or more users requesting the one or more sources, identities of the identified available media files.

9. The computer-implemented method of claim 8, further comprising dynamically linking references to the one or more sources to the available media files identified.

10. The computer-implemented method of claim 8, wherein:
    the user context information includes multiple resolutions suitable for the one or more users; and
    identifying available media files further comprises identifying the availability of media files including versions of the one or more sources in each of the multiple resolutions.

11. The computer-implemented method of claim 8, further comprising, if a media file is unavailable for the one or more requested sources, retrieving the unavailable material from an archive.

12. The computer-implemented method of claim 8, further comprising, if a media file is unavailable for the one or more requested sources, generating the unavailable material from, existing media files.

13. The computer-implemented method of claim 8, wherein the user context information includes at least one characteristic selected from the group consisting of an indication whether media files with higher than or lower than the resolution of the media files associated with the one or more requested sources are acceptable to the one or more users, user environment information, and media quality parameters.

14. A computer program product, comprising:
    a computer readable medium;
    computer program instructions stored in the computer readable medium that, when executed by a computer, instruct the computer to perform a method for managing access to media files in a distributed media system, comprising the steps of:
    providing access to an index database that indexes media files available to the distributed media system;
    receiving requests from one or more users for media files, wherein a request includes an indication of one or more sources, and wherein the media files available to the distributed media system include a plurality of versions of the one or more sources, each of the plurality of versions for a given source of the one or more sources having at least one of a different resolution and compression;
    identifying, from the index database, available media files for the one or more sources, that include a version of the one or more sources having at least one of a resolution and compression determined from user context information for the one or more users; and
    providing to the one or more users requesting the one or more sources, identities of the identified available media files.

15. The computer program product of claim 14, wherein the computer program instructions further instruct the computer to dynamically link references to the one or more sources to the available media files identified.

16. The computer program product of claim 14, wherein the computer program instructions further instruct the computer to retrieve the unavailable material from an archive, if a media file is unavailable for the one or more requested sources.

17. The computer program product of claim 14, wherein the computer program instructions further instruct the computer to generate the unavailable material from existing media files if a media file is unavailable for the one or more requested sources.

* * * * *